United States Patent
Aviles et al.

(10) Patent No.: US 11,481,545 B1
(45) Date of Patent: Oct. 25, 2022

(54) CONDITIONAL PROCESSING OF ANNOTATED DOCUMENTS FOR AUTOMATED DOCUMENT GENERATION

(71) Applicant: Orbis Technologies, Inc., Annapolis, MD (US)

(72) Inventors: Gabriel Aviles, Kissimmee, FL (US); Donald Thomas Smith, Grand Prairie, TX (US)

(73) Assignee: Orbis Technologies, Inc., Annapolis, MD (US)

( * ) Notice: Subject to any disclaimer, the term of this patent is extended or adjusted under 35 U.S.C. 154(b) by 0 days.

(21) Appl. No.: 17/359,854

(22) Filed: Jun. 28, 2021

(51) Int. Cl.
G06F 21/00 (2013.01)
G06F 40/186 (2020.01)

(52) U.S. Cl.
CPC .................. *G06F 40/186* (2020.01)

(58) Field of Classification Search
CPC ..................................................... G06F 40/186
See application file for complete search history.

(56) References Cited

U.S. PATENT DOCUMENTS

| | | | | |
|---|---|---|---|---|
| 11,100,373 | B1* | 8/2021 | Crosby | G06K 9/6256 |
| 2010/0299763 | A1* | 11/2010 | Marcus | G06Q 10/06 726/30 |
| 2013/0174280 | A1* | 7/2013 | Fujimori | H04N 1/32128 726/30 |

OTHER PUBLICATIONS

"Tips for Understanding Styles in Word", https://shaunakelly.com/word/styles/stylesms.html, downloaded from the internet on Mar. 15, 2022, 7 pages.

* cited by examiner

*Primary Examiner* — Hassan Mrabi
(74) *Attorney, Agent, or Firm* — Edell, Shapiro & Finnan, LLC

(57) ABSTRACT

A computer system conditionally processes a template document to produce one or more finished documents. Annotations in the template document are identified, each annotation indicating an instruction name and a portion of the template document to which the annotation is applied. The template document is processed using one or more structured data feeds that indicate, for each annotation, instructions for transforming the portion of the template document associated with the annotation, wherein the instructions are indicated by the instruction name of the annotation. Finished documents are generated by executing the instructions to transform the template document into each finished document, wherein transforming includes: replacing data in the template document, adding data to the template document, and removing data from the template document. Embodiments of the present invention further include a method and program product for conditionally processing content in an annotated document in substantially the same manner described above.

20 Claims, 8 Drawing Sheets

```
DATE = "July 18"
PRICE_APPLES = "3"
PRICE_PEARS = "3.50"
PRICE_PEACHES = "4"
LIMITED_ITEM = STRAW
IF LIMITED_ITEM = STRAW THEN INSERT_TEXT = "Strawberries are available for a limited time!"
IF LIMITED_ITEM = GRAPES THEN INSERT_TEXT = "Grapes are available for a limited time!"
```

FIG.6C

```
Price Sheet for July 18
Apples: $3/lb
Pears: $3.50/lb
Peaches: $4/lb
Strawberries available for a limited time!
```

FIG.6D

CONDITIONAL PROCESSING OF ANNOTATED DOCUMENTS FOR AUTOMATED DOCUMENT GENERATION

BACKGROUND

1. Technical Field

Present invention embodiments relate to document publication tools, and more specifically, to processing annotated documents to automatically generate finished documents.

2. Discussion of the Related Art

Automated document generation enables users to generate, customize, edit, and produce finished documents that are ready for publication, delivery, or any other desired usecase. The generation of documents can be automated by employing templates that can be modified or populated with data to produce finished documents. A single template document can be conditionally processed to produce different finished documents that are personalized for particular recipients. However, conventional word processing techniques impose restrictions on the use of templates for automated document generation.

SUMMARY

According to one embodiment of the present invention, a computer system conditionally processes a template document to produce one or more finished documents. Annotations in the template document are identified, each annotation indicating an instruction name and a portion of the template document to which the annotation is applied. The template document is processed using one or more structured data feeds that indicate, for each annotation, instructions for transforming the portion of the template document associated with the annotation, wherein the instructions are indicated by the instruction name of the annotation. The one or more finished documents are generated by executing the instructions to transform the template document into each finished document, wherein transforming includes: replacing data in the template document, adding data to the template document, and removing data from the template document. Embodiments of the present invention further include a method and program product for conditionally processing content in an annotated document in substantially the same manner described above.

In some embodiments, an instruction name of an annotation includes a variable, and the variable is evaluated using the one or more structured data feeds to determine the instructions to apply to the template document for each structured data feed. In some embodiments, the one or more annotations are supported natively by a file type of the template document. In some embodiments, the one or more annotations include one or more of: a comment applied to a portion of the template document, the content of the comment comprising the instruction name, and a style applied to a portion of the template document, the style name of the style comprising the instruction name. In some embodiments, the template document is processed using the one or more structured data feeds by an extension of a word processing module. In some embodiments, the one or more structured data feeds are separate documents from the template document. In some embodiments, the template document is presented to a user via a user interface, and the one or more annotations are hidden from the user interface.

BRIEF DESCRIPTION OF THE DRAWINGS

Generally, like reference numerals in the various figures are utilized to designate like components.

FIG. 6C is a block diagram depicting a structured data feed in accordance with an embodiment of the present invention;

FIG. 6D is a user interface diagram depicting a document in accordance with an embodiment of the present invention.

DETAILED DESCRIPTION

Figure 1:
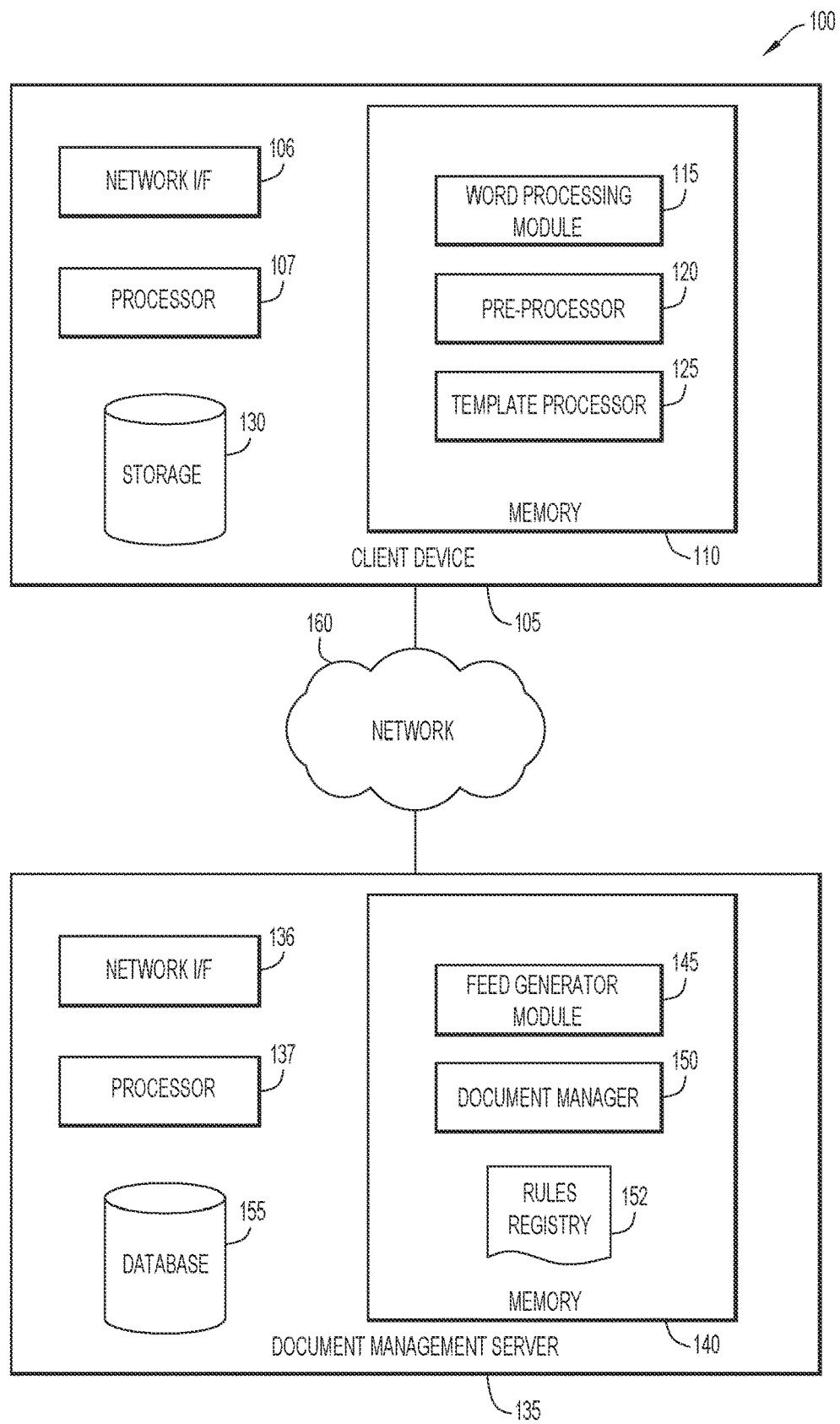
FIG. 1 is a block diagram depicting a computing environment for automated document generation in accordance with an embodiment of the present invention.

Present invention embodiments relate to document publication tools, and more specifically, to processing annotated documents to automatically generate finished documents. In conventional approaches to preparing finished documents, template documents can be employed that are populated with data and/or otherwise modified to produce the resulting finished documents. In such approaches, a template document may contain instructions, embedded in-line with the text of the document, that enable the template document to be processed into customized finished documents that are fit for delivery and publication. For example, a Microsoft® Word document can include Visual Basic scripts, inserted alongside the prose of the document, that provide the instructions for processing the document.

However, conventional approaches to automatically generating finished documents have several limitations due to the necessity of including the processing instructions for a document in-line with the rest of the document's text. Such a template document does not separate the roles of the developers who write the scripts from the content experts who write the rest of the text of a template document. Thus, it is quite easy for a content expert to accidentally make modifications to the instructions while attempting to edit the non-executable portions of the document (e.g., the portions of the template document intended to be read by a recipient). For example, a user who is attempting to rephrase a sentence might erroneously insert a character or two into an executable portion of the document, rendering the entire document unusable until a developer can identify the error and rectify the code. Moreover, when instructions are embedded in a template document's text, it is difficult to visualize the final layout of finished document, since the instructions will not appear in such documents but do appear in the template.

In contrast, present invention embodiments employ template documents that are annotated with metadata that enables the automatic transformation of template documents into finished documents without making the instructions vulnerable to erroneous user edits and while maintaining readability of the template document. A template document can be annotated using annotation techniques that are natively supported by a word processing application, and those annotations can identify the portions of the template document that may be targeted for subsequent processing. For example, a template document can be annotated using a particular style annotation or a comment annotation, and the name of the style or the contents of the comment can provide information that indicates how the template document should be processed.

Thus, present invention embodiments improve computer-based word processing technology by improving the accuracy of processing template documents to generate finished documents that are ready for publication. In particular, present invention embodiments provide the practical application of eliminating the possibility of a user introducing errors into executable code by utilizing unconventional techniques to indicate how and where a template document should be processed. Moreover, a template document can be annotated with the names of particular instruction sets rather than including the instructions themselves, thereby providing a layer of abstraction that enables different instruction sets to be applied to a same template document to yield substantially different resulting documents. Additionally, storing instructions separately from template documents provides the practical application of reducing the file sizes of the template documents, thus reducing the overall data footprint of the document generation process by enabling users to store and/or transmit the template document and only the minimum necessary supporting documents (e.g., the documents that contain the executable instructions) to support a particular use-case. By reducing the overall amount of data that is required to produce finished documents, present invention embodiments improve the functioning of a computer by reducing computing storage resources that are consumed and/or by reducing bandwidth consumption.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for automated document generation in accordance with an embodiment of the present invention. As depicted, computing environment 100 includes a client device 105, a document management server 135, and a network 160. It is to be understood that the functional division among components of computing environment 100 have been chosen for purposes of explaining present invention embodiments and is not to be construed as a limiting example.

Client device 105 includes a network interface (I/F) 106, at least one processor 107, memory 110, and storage 130. Memory 110 further includes a word processing module 115, a pre-processor 120, and a template processor 125. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 160. In general, client device 105 enables templates documents to be created, edited, and/or processed to produce finalized documents. Client device 105 may include internal and external hardware components, as depicted and described in further detail with respect to FIG. 7.

Word processing module 115, pre-processor 120, and/or template processor 125 may include one or more modules or units to perform various functions of present invention embodiments described below. Word processing module 115, pre-processor 120, and/or template processor 125 may be implemented by any combination of any quantity of software and/or hardware modules or units, and may reside within memory 110 of client device 105 for execution by a processor, such as processor 107.

Word processing module 115 includes any software application that provides for the input, editing, formatting, and output of text, such as a text editor or desktop publishing application. As examples, word processing module 115 can include software applications such as Microsoft® Word, Corel® WordPerfect®, LibreOffice® Writer, and the like. Word processing module 115 enables user to create, edit and read documents, including template documents and finalized documents. Additionally, word processing module 115 may extend support to additional non-text media such as image, audio, and/or video data, which can be inserted alongside the text and/or each other to create multimedia documents.

Word processing module 115 may be compatible with document formats that natively support the annotation of text and/or other content in documents. Annotations may be implemented as metadata that describe the portions of a document to which the annotations are applied. In particular, an annotation may be added to a document's data file as metadata that indicates the position in the document at which the annotation begins and/or the position in the document at the annotation ends (or alternatively, the span/length of the annotation). The positions in a document at which an annotation starts and ends can be defined in relation to other items in the document, such as characters, words, paragraphs, pages, and the like. In some embodiments, an annotation may occupy a single point in the document rather than span a portion of the document. Annotations can be defined according to any conventional or other technique for indicating portions of text. For example, an annotation can be defined as beginning at the twenty-first character of a document and ending at the seventy-fifth character. As another example, annotations can also be defined according to a combination of countable features of a document, such as a particular character or word position on a particular page or in a particular paragraph. As yet another example, annotations can be defined using a two-dimensional coordinate system to describe locations in a document.

Word processing module 115 includes support for annotations that include comment annotations and/or style annotations. Comment annotations may include comments that are applied to a portion of a document, and can be natively implemented as part of a document review or collaboration function of word processing module 115. Style annotations can include styles that are applied to a portion of a document, and can likewise be natively implemented by word processing module 115, Annotations can overlap each other, and can be nested, such that multiple different operations can be applied to a same portion of a template document and/or a same portion can be iteratively processed.

Annotations can be hidden from a user interface in order to prevent a user from inadvertently interacting with and/or editing any annotations in the course of the user's activity with respect to a document the user is accessing via word processing module 115. Comment annotations can be hidden by toggling off a review mode of word processing module 115, which may disable other features from the user interface, such as markup (e.g., text insertion and strikethrough).

Style annotations, which may be used by word processing module 115 to apply certain settings to a portion of a document, such as a font type, size, color, and the like, can be hidden by matching the style that the document currently utilizes in the portion of the document to which the style annotation is applied. Style annotations that are used by embodiments herein to process a template document can thus be distinguished from the styles already present in a template document by defining new style types that match the characteristics of the template document, but have a different style name. For example, a portion of a template document may have a first style type (named "Normal," for example) that is assigned to text for the purpose of applying a certain font type and size to the text; a style annotation may match the same font type and size, but may be defined with a different title (e.g., "instruction A") to differentiate the style annotation as indicating that a particular operation ("instruction A") should be applied to the template document wherever the style annotation is present.

Pre-processor 120 and template processor 125 are modules that can interact with word processing module 115 and/or each other in order to process template documents into finished documents. Pre-processor 120 and template processor 125 may be installed as extensions or "plug-ins" into word processing module 115, or may be stand-alone modules that are executable by client device 105. In general, pre-processor 120 obtains structured data feeds and prepares structured data feeds for processing in combination with a template document, and template processor 125 processes the template document to produce finished documents by combining the template document with each structured data feed.

In particular, pre-processor 120 may obtain structured data feeds from one or more locations and prepare the structured data feeds for processing in combination with a template document. A structured data feed may include any document that contains data that is organized according to a predefined schema. Additionally, a structured data feed may include executable instructions for transforming a template document using the data stored within the structured data feed. In some embodiments, a structured data feed includes instruction names that are associated with other data, such as variables or particular instructions, so that when an annotation in the template document matches an instruction name, the template document will be populated with the associated variable or processed according to the associated instructions.

When pre-processor 120 obtains a structured data feed, pre-processor 120 prepares the structured data feed for processing in combination with a template document. In various embodiments, pre-processor 120 may store a structured data feed in a particular location (e.g., in memory, in a non-volatile storage medium, etc.) that is accessible by template processor 125. Additionally or alternatively, pre-processor 120 may perform pre-processing operations such as converting a structured data feed to another format, performing error-checking operations, and the like. In some embodiments, pre-processing operations can include any task that organizes content of a structured data feed prior to processing, such as removing unwanted data, standardizing data, de-identifying data, correcting errors in data, and the like.

Template processor 125 processes a template document in combination with one or more structured data feeds to produce finished documents that are fit for their intended use-case. In particular, template processor 125 may identify one or more annotations in a template document and use data that is associated with each annotation to determine how, according to a structured data feed, the template document should be transformed into a finished document. In some embodiments, an annotation indicates an instruction name, and template processor 125 identifies the corresponding instruction in a structured data feed to obtain the instructions that should be applied to the portion of the document corresponding to the annotation.

In particular, a portion of a document may be annotated with a variable name, and a structured data feed may store a value associated with that variable name along with instructions to replace the annotated portion of the document with the variable's value. Another structured data feed may assign a different value to the variable, so that when template processor 125 processes the template document using the other structured data feed, a different finished document is generated. In some embodiments, the instructions associated with an instruction name may include instructions to include the annotated portion of the document in the finished document, to omit the annotated portion from the finished document, or to perform any desired operation or combination of operations to the annotated portion of the document. Template processing is depicted and described in further detail with respect to FIGS. 2 and 3.

Storage 130 may include any non-volatile storage media known in the art. For example, storage 130 can be implemented with a tape library, optical library, one or more independent hard disk drives, or multiple hard disk drives in a redundant array of independent disks (RAID). Similarly, data in storage 130 may conform to any suitable storage architecture known in the art, such as a file, a relational database, an object-oriented database, and/or one or more tables. In some embodiments, storage 130 may store data relating to automated document generation, including template documents, structured data feeds, finished documents, and the like.

Document management server 135 includes a network interface (I/F) 136, at least one processor 137, and memory 140. Memory 140 may include a feed generator module 145, a document manager 150, and a rules registry 152. Document management server 135 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 136 enables components of document management server 135 to send and receive data over a network, such as network 160. In general, document management server 135 and its modules support automated document generation by storing and making available template documents and structured data feeds, as well as generating and/or updating structured data feeds. Document management server 135 may include internal and external hardware components, as depicted and described in further detail with respect to FIG. 7.

Feed generator module 145 and document manager 150 may include one or more modules or units to perform various functions of present invention embodiments described below. Feed generator module 145 and document manager 150 may be implemented by any combination of any quantity of software and/or hardware modules or units, and may reside within memory 140 of document management server 135 for execution by a processor, such as processor 137.

Feed generator module 145 processes data into structured data feeds by organizing input data into a particular schema that is defined for each structured data feed. In particular, a relationships between the input data and a structured data feed are provided so that input data can automatically be organized into the structured data feed. Input data can be organized in any format, such as raw data, lists, rows and columns, and the like. As an example, feed generator module 145 may process tabular data according to a defined relationship between the tabular data and the schema of a structured data feed by organizing data from particular rows and columns into particular locations of the structured data feed. In some embodiments, feed generator module 145 generates structured data feeds that are in an Extensible Markup Language (XML) format.

Structured data feeds that are generated by feed generator module 145 can be stored in one or more locations, such as database 155 of document management server 135. Feed generator module 145 may produce new structured data feeds, or update existing structured data feeds, according to a particular schedule or in an ad hoc fashion as new data becomes available or relevant. For example, time-series data may be made available according to a recurring schedule, and feed generator module 145 may produce updated structured data feeds at a frequency that is based on the recurring schedule.

Document manager 150 includes a record of template documents and structured data feeds that are available for processing into finished documents. In addition, document manager 150 may include a record of the relationships between template documents and structured data feeds, as structured data feeds may be associated with particular template documents. Document manager 150 may process requests to generate finished documents by providing a requesting device, such as client device 105, with the template document and/or structured data feeds that are needed to generate the desired finished documents. In some embodiments, when a user creates a new template document or defines a new schema for a structured data feed, document manager 150 records the new template document or structured data feed schema, and indicates a relationship between structured data feeds generated by feed generator module 145 with their corresponding template documents.

Rules registry 152 may include a set of rules that are persisted in document management server 135 and can be referenced by client device 105. Rules registry 152 enables complex rule expression that may not be adequately supported using simple XML, attributes. Rather, rules registry 152 may include rules that are given unique identifiers by which the rules are referenced in a template document. Rules of rules registry 152 may be referenced by a template document along with a conditional attribute to enable content inclusion or exclusion.

Database 155 may include any non-volatile storage media known in the art. For example, database 155 can be implemented with a tape library, optical library, one or more independent hard disk drives, or multiple hard disk drives in a redundant array of independent disks (RAID). Similarly, data in database 155 may conform to any suitable storage architecture known in the art, such as a file, a relational database, an object-oriented database, and/or one or more tables. In some embodiments, database 155 may store data relating to automated document generation, including template documents, structured data feeds, raw data associated or not yet associated with structured data feeds, finished documents, and the like.

Network 160 may include a local area network (LAN), a wide area network (WAN) such as the Internet, or a combination of the two, and includes wired, wireless, or fiber optic connections. In general, network 160 can be any combination of connections and protocols known in the art that will support communications between client device 105 and/or document management server 135 via their respective network interfaces in accordance with embodiments of the present invention.

Figure 2:
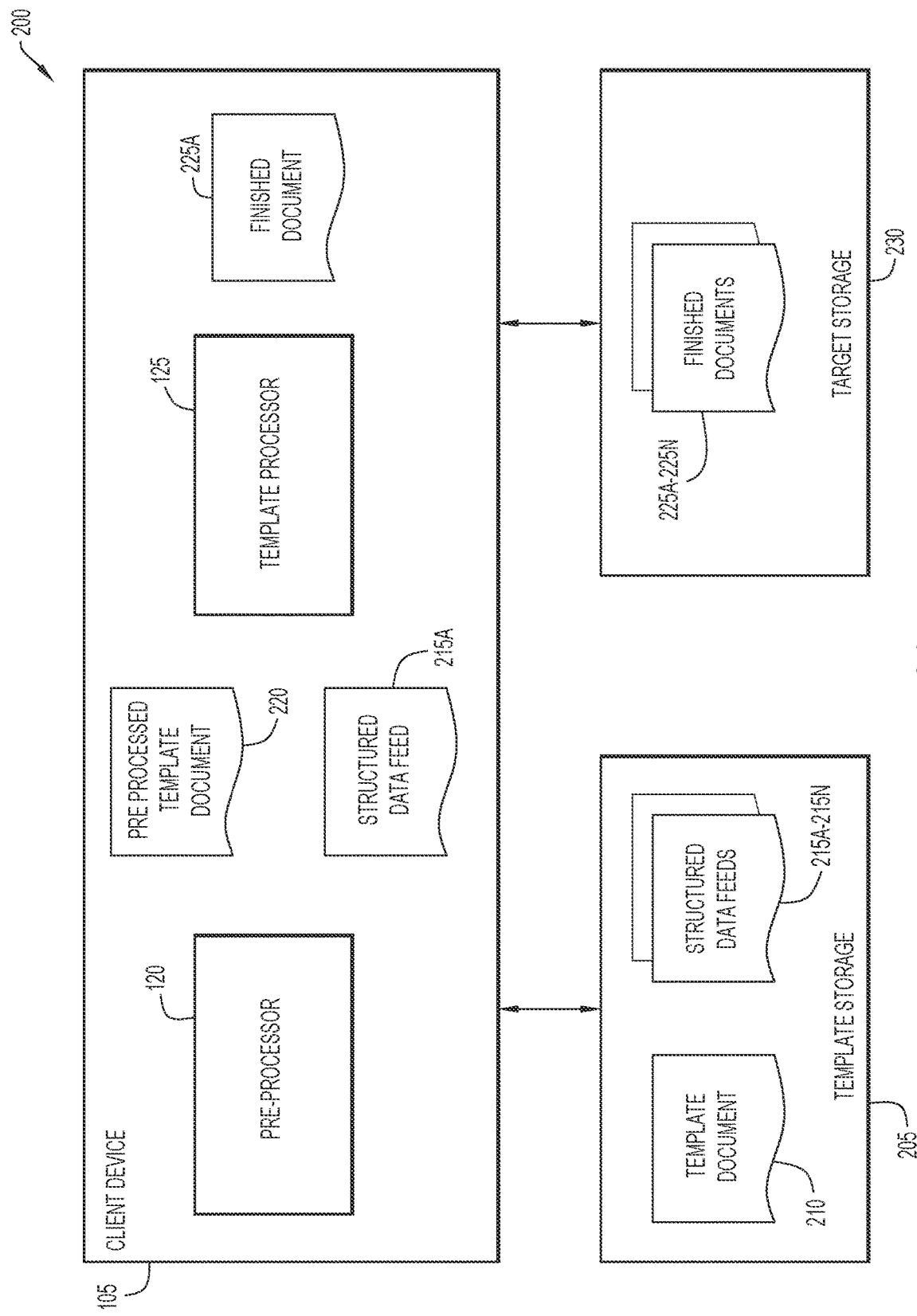
FIG. 2 is a block diagram depicting a computing system for automated document generation in accordance with an embodiment of the present invention.

FIG. 2 is a block diagram depicting a computing system 200 for automated document generation in accordance with an embodiment of the present invention. As depicted, computing system 200 includes a client device 105, template storage 205, and target storage 230. In general, client device 105 obtains template documents from template storage 205, transforms the template documents into finished documents, and provides the finished documents to target storage 230.

In response to a user request, pre-processor 120 of client device 105 retrieves a requested template document, such as template document 210, from template storage 205. Template storage many include any local storage or network-accessible storage, such as storage 130 of client device 105 or database 155 of document management server 135. Additionally, pre-processor 120 fetches any structured data feeds that are associated with the requested template document. For example, structured data feeds 215A-215N may be associated with template document 210 and may therefore be fetched by pre-processor 120. In some embodiments, pre-processor 120 performs other preparatory tasks that are applied to the data of structured data feeds 215A-215N, such as removing unwanted data, modifying data to simplify downstream processing, and the like. Pre-processor 120 may pre-process a structured data feed with reference to rules registry 152 to enable complex rule expressions, such as the inclusion or exclusion of specific content or sections of a document based on specific conditional attributes of the data in a structured data feed.

Pre-processor 120 prepares template document 210 for processing to produce pre-processed template document 220. Template processor 125 may then process the pre-processed template document 220 along with the associated structured data feeds to produce a finished document. Template processor 125 may generate one finished document, such as finished document 225A, for each structured data feed, such as structured data feed 215A. In some embodiments, template processor 125 processes each structured data feed 215A-215N in sequence until all of the structured data feeds 215A-215N have been processed. In some embodiments, template processor 125 may process some or all of structured data feeds 215A-215N in parallel.

When template processor 125 outputs a finished document, such as finished document 225A, the finished document is transferred to target storage 230. Target storage 230 may include any desired local or network-accessible storage destination. In some embodiments, different finished documents 225A-225N are sent to different destinations. Each finished document 225A-225N may be transferred to target storage 230 when the finished document becomes available (i.e., when a finished document is finalized), or finished documents 225A-225N may be provided to target storage 230 when the set of finished documents 225A-225N has been finalized.

Figure 3:
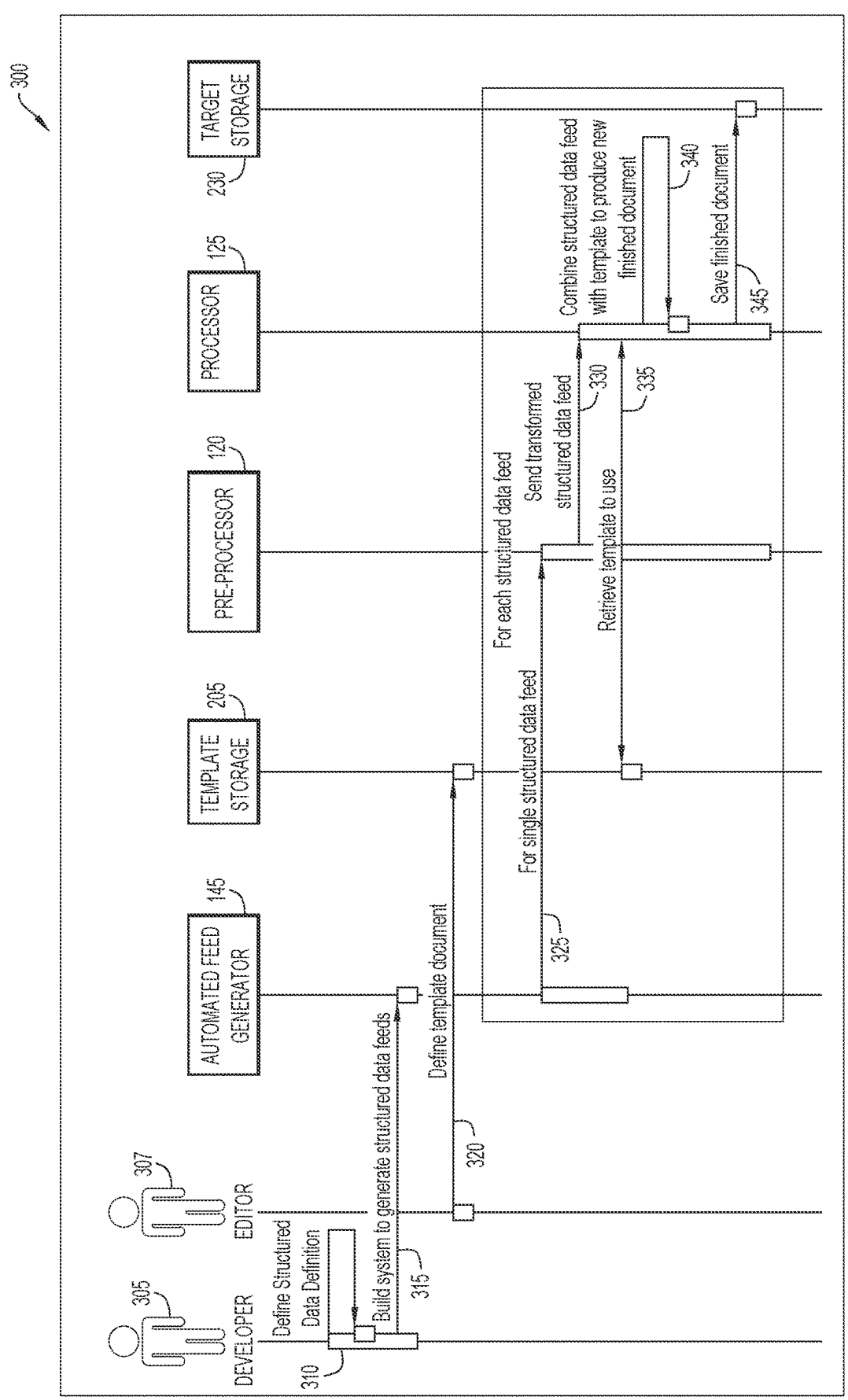
FIG. 3 is a sequence diagram depicting an automated document generation sequence in accordance with an embodiment of the present invention.

FIG. 3 is a flow diagram 300 depicting an automated document generation in accordance with an embodiment of the present invention.

At operation 310, a structured data definition is provided. A user, such as developer 305, defines the schema for a structured data feed. A structured data feed may include an XML document that stores the data in a tree-like structure of nodes that can be referenced using XPath expressions. In some embodiments, the structured data feed stores instructions for processing a template document, along with any data that is necessary for each instruction to be applied to the template document (e.g., data that will be included in the template document).

At operation 315, a system is built to generate structured data feeds. A user, such as developer 305, provides instructions to convert input data from its native format to the format of the structured data feed that was defined at operation 310. For example, the system may be instructed to retrieve a specific subset of input data, such as a data value stored in a particular row and column, and store the retrieved data in a specific node of the structured data feed.

Template documents are defined at operation 320. A user, such as editor 307, may define a template document that includes formatted text and other media that is desired to be included in any of the finished documents. The template document may include portions that are annotated to identify that those portions are subject to processing when the template document is used to generate finished documents. Non-annotated portions of the template document may be omitted from processing, and thus may include aspects that will remain unchanged in any finished documents generated from the template document. For example, a title, an address of the sender, a background section, and the like may not be annotated as those portions should remain in all finished documents.

The annotations are natively supported by a word processor that is used to generate and edit the template document, and may include comment annotations and/or style annotations. In some embodiments, template documents can include nested annotations and/or overlapping annotations. A template document may include some annotated portions that are inconsistent with each other, as not all portions will be included in a finished document. For example, a template document for a contract may contain twelve different paragraphs that are each relevant for a particular month in the calendar year, and only one of which will be included in a finished document at one time, depending on the target month for which the finished document is intended.

A structured data feed is provided at operation 325. The structured data feed may be generated by feed generator module 145 according to the definition provided by developer 305, and may thus include data and instructions for modifying the template document. Pre-processor 120 may process the structured data feed to produce a transformed structured data feed that is prepared for processing along with a template document.

A transformed structured data feed is provided to template processor 125 at operation 330. Additionally, template processor 125 retrieves a template document from template storage 205 at operation 335. With the transformed structured data feed and the template document, template processor 125 can begin to generate finished documents by combining the structured data feed with the template document at operation 340. Template processor 125 may process each annotation of the template document by using data that is associated with the annotation that references the structured data feed. In particular, the content of a comment annotation, or the title of a style annotation, may contain data that is used to identify instructions and/or data in particular in the structured data feed. For example, one instruction may replace characters or strings in the annotated portion of text with other characters or strings indicated in the structured data feed. As another example, an instruction may include an annotated portion of the template document in the finished document, may move an annotated portion to another location in the template document, may delete an annotated portion of the document, may modify the formatting of an annotated portion of the document, and the like.

The finished document is saved at operation 345. Template processor 125 evaluates each annotation of the template document against each structured data feed until all of the structured data feeds have been processed and a resulting set of finished documents is completed. The finished documents can be provided to target storage 230, which may include any local media or network-accessible destination(s).

Figure 4:
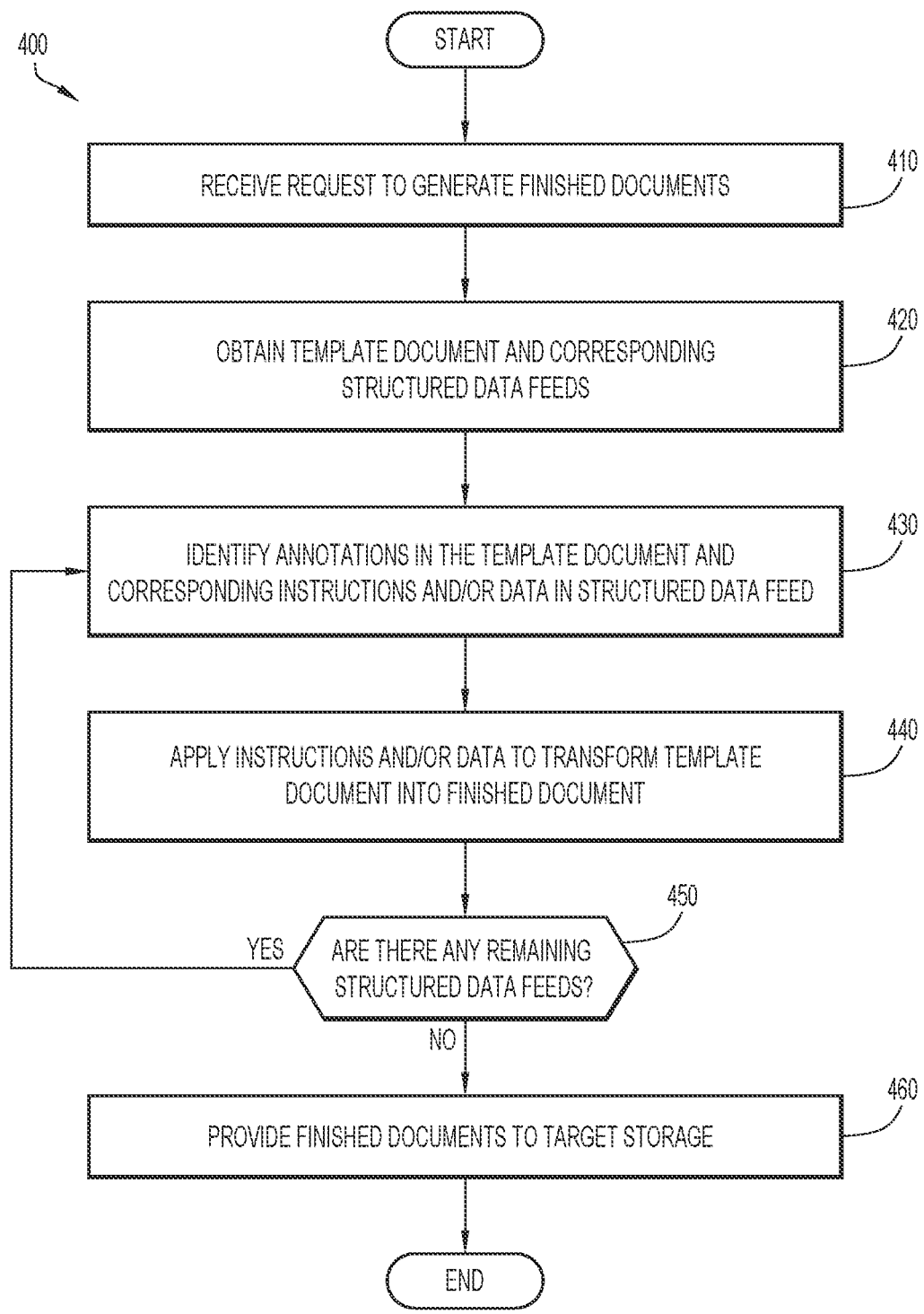
FIG. 4 is a flow chart depicting a method of processing a template document to generated finished documents in accordance with an embodiment of the present invention.

FIG. 4 is a flow chart depicting a method 400 of processing a template document to generated finished documents in accordance with an embodiment of the present invention.

A request to generate a finished set of documents is received at operation 410. A user of client device 105 may initiate the process of generating finished documents by indicating a particular template document and one or more structured data feeds for the template document.

A template document and corresponding structured data feeds are obtained at operation 420. Client device 105 may retrieve the requested template document and structured data feeds from a document storage location, such as database 155 of document management server 135, or storage 130 of client device 105.

Annotations in the template document and the corresponding instructions and/or data in a structured data feed are identified at operation 430. Template processor 125 may analyze the template document to identify each annotation in the template document and to extract the data that is associated with each annotation. The extracted data may be stored as a title of a style in the case of style annotations and may be stored in the text of a comment in the case of comment annotations. The extracted data may be evaluated against the structured data feed to determine how to process the corresponding portion of the template document. In some embodiments, the extracted data may contain an expression that can be applied to the structured data feed to determine a particular value, such as a variable's value or a true or false value, that is used to conditionally process the template document. For example, an annotation may include an xPath expression that, when evaluated against an XML-format structured data feed, yields a Boolean "true" result, indicating that the annotated portion of the document should remain in the finished document (e.g., rather than be deleted). As another example, an annotation may include an expression that can be evaluated against the structured data feed to provide a numerical value, such as a current price of a good or service, that should be included in the finished document. In some embodiments, strings or characters in the text of the document to which an annotation is applied is evaluated against a structured data feed to determine which operations to perform to the string or characters, or whether to apply any operations at all.

Thus, the identified instructions are applied to transform the template document into a finished document at operation 440. In some embodiments, the instructions that correspond to replacing or inserting text into a document are performed prior to the operations that remove portions of the document, as some of the replaced or inserted text could affect the evaluation of expressions and thus the determination of whether to include or exclude portions of a document. When all of the annotations have been processed against the structured data feed, the finished document can be finalized, and post-processing operations may be applied. In particular, the annotations may be stripped from the document, or the document may be saved in another format, such as a Portable Document Format (PDF), a Hypertext Markup Language (HTML) format, an electronic publication (ePUB) format, and the like.

Operation 450 determines whether there are any remaining unprocessed structured data feeds. If all of the structured data feeds included in the user's request have been processed, then the finished documents are provided to the target storage at operation 460. If there are structured data feeds that have not yet been processed, then a next structured data feed is selected by template processor 125 and processed at operation 430, repeating until all of the structured data feeds have been processed. The finished documents are provided to a target storage of the user's selection, which can include any local storage or network-accessible storage, email address, printer address, and the like. Thus, by applying a same template document to different structured data feeds, different finished documents can be produced, such as customized brochures for different customers, customized invoices, individualized insurance quotes, individualized legal documents, individualized regulatory compliance submissions, and the like.

Figure 5:
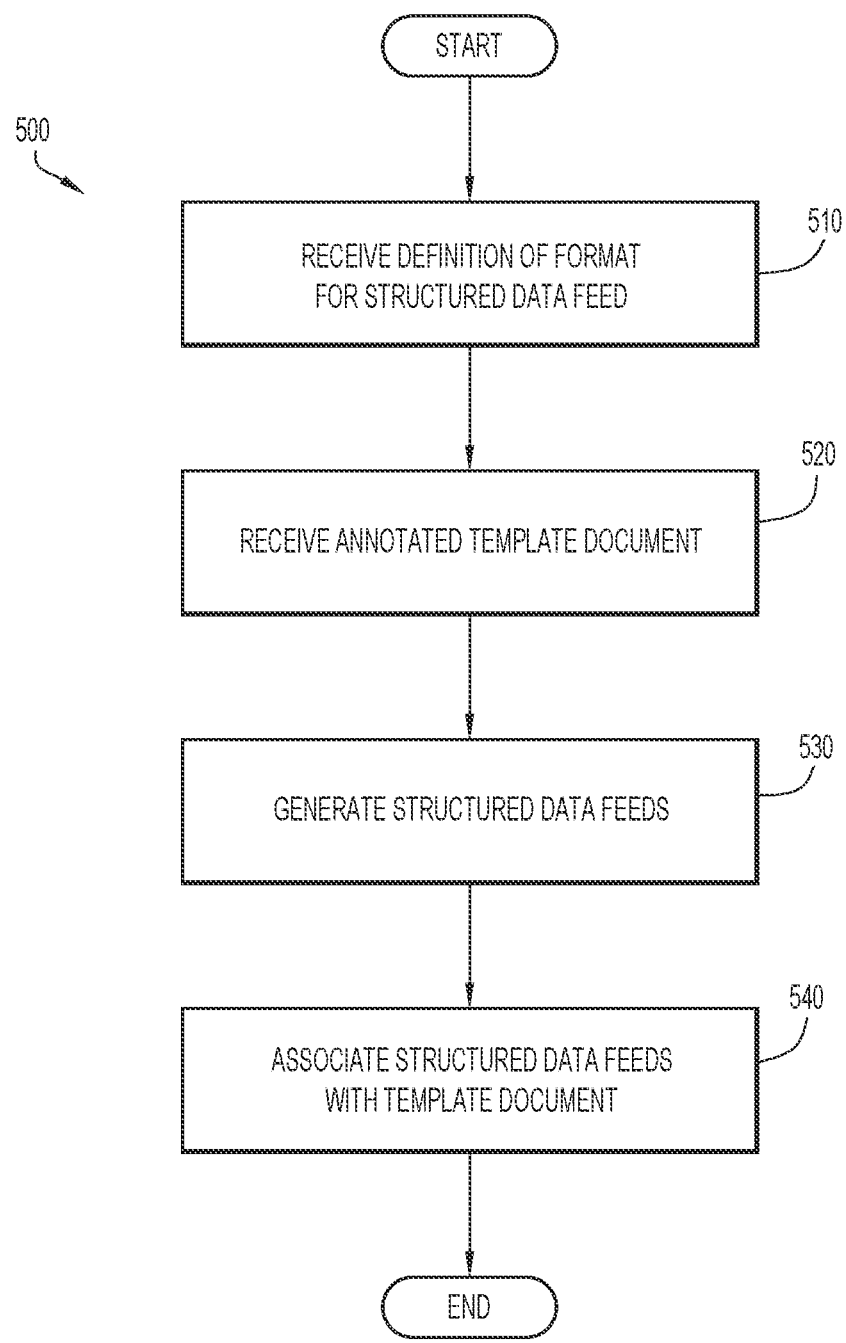
FIG. 5 is a flow chart depicting a method of defining a template document and structured data feeds in accordance with an embodiment of the present invention.

FIG. 5 is a flow chart depicting a method of defining a template document and structured data feeds in accordance with an embodiment of the present invention.

The definition of the format for a structured data feed is received at operation 510. A user, such as a developer, can define the format of a structured data feed, particularly the locations of where certain data should be stored, and any instructions for applying the data to a template document or otherwise transforming a template document. The format may include a tree structure of parent nodes and child nodes, any of which can reference any other parent or child node(s). In some embodiments, the format includes an XML format.

An annotated template document is received at operation 520. A user may define an annotated template document by applying annotations to portions of a document to tag the document with specific identifiers that reference instructions and/or data in the defined format of the structured data feed. The user may work backwards from an example finished document to annotate the variable portions of the document while leaving unannotated any portions of the document that should remain constant in all of the desired finished documents. In some embodiments, conventional or other machine learning algorithms may be employed to compare different finished documents to identify the portions that should be annotated and left unannotated. For example, when two documents are compared, the portions that overlap with each other may be considered static content and left unannotated, and the portions that are unique to a particular document should be annotated in both documents as those portions represent conditional content.

Structured data feeds are generated at operation 530. Using the defined format of the structured data feed, input data may be processed to convert the input data from its native format into the defined format of the structured data feeds. Thus, input data is processed to ensure that the resulting structured data feeds are compatible with the template document.

The structured data feeds are associated with the template document at operation 540. Any generated structured data feeds are assigned to the template document and stored in one or more storage locations, such as database 155, for later retrieval when a document generation request is initiated.

Figure 6A:
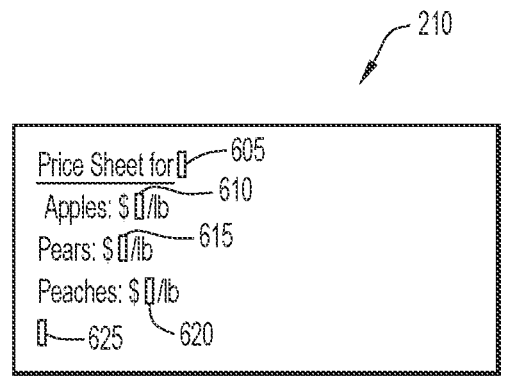
FIG. 6A is a block diagram depicting a template document in accordance with an embodiment of the present invention.

FIG. 6A is a block diagram depicting a template document 215 in accordance with an embodiment of the present invention. As depicted, template document 215 includes text, and is annotated with annotations 605, 610, 615, 620, and 625. The depicted annotations 605, 610, 615, 620, and 625 may not be visible to an end-user. In some embodiments, annotations 605, 610, 615, 620, and 625 may only be visible to a user who defines or edits template documents, such as editor 307.

Each annotation may indicate a portion of template document 215 to which the annotation is applied, and each annotation may include an instruction name for processing template document using one or more structured data feeds. In the depicted example of FIGS. 6A-6D, annotation 605 may indicate an instruction name of "DATE," annotation 610 may indicate an instruction name of "PRICE_APPLES," annotation 615 may indicate an instruction name of "PRICE_PEARS," annotation 620 may indicate an instruction name of "PRICE_PEACHES," and annotation 625 may indicate an instruction name of "INSERT_TEXT."

Figure 6B:
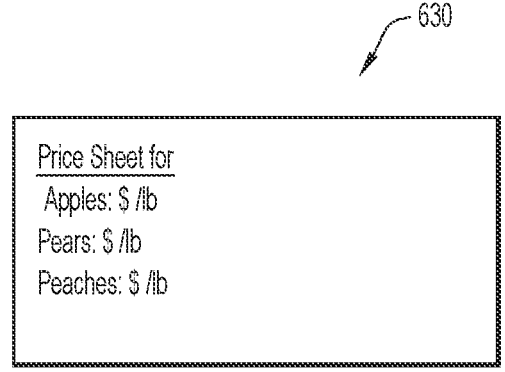
FIG. 6B is a user interface diagram depicting a view of a user in accordance with an embodiment of the present invention.

FIG. 6B is a user interface diagram depicting a view 630 of a user in accordance with an embodiment of the present invention. View 630 may correspond to the embodiment that is depicted and described in FIG. 6A, and may be a view that is presented to an end-user. Thus, an end-user may not view or interact with the annotations of a template document, and therefore cannot inadvertently introduce errors into a template document that would affect the execution of instructions.

FIG. 6C is a block diagram depicting a structured data feed 215 in accordance with an embodiment of the present invention. Structured data feed 215 includes a list of instruction names, which can be variables, and also includes corresponding values for those variables. Thus, structured data feed 215 indicates a value of "July 18" for the instruction name "DATE", which corresponds to annotation 605 of FIG. 6A. Structured data feed 215 indicates a value of "3" for the instruction name "PRICE_APPLES", which corresponds to annotation 610 of template document 210 depicted in FIG. 6A. Structured data feed 215 indicates a value of "3.50" for the instruction name "PRICE_PEARS", which corresponds to annotation 615 of template document 210 depicted in FIG. 6A. Structured data feed 215 indicates a value of "4" for the instruction name "PRICE_PEACHES", which corresponds to annotation 620 of template document 210 depicted in FIG. 6A. Additionally, structured data feed 215 indicates a value of "STRAW" for the variable "LIM- ITED_ITEM," which is not indicated by an annotation of structured data feed 215 but rather indicates which text should be inserted when the instruction "INSERT_TEXT" is executed. Thus, in the depicted example, since "LIMITED_ITEM" has a value of "STRAW," the text that is inserted is "Strawberries are available for a limited time."

FIG. 6D is a user interface diagram depicting a finished document 225 in accordance with an embodiment of the present invention. As depicted, finished document 225 may be generated as a result of processing template document 210 in combination with structured data feed 215, and may thus correspond to the embodiments depicted in FIGS. 6A and 6C. Thus, the annotated portions of template document 210 have been populated with values indicated by structured data feed 215, and text has been inserted according to the instructions of structured data feed 215.

Figure 7:
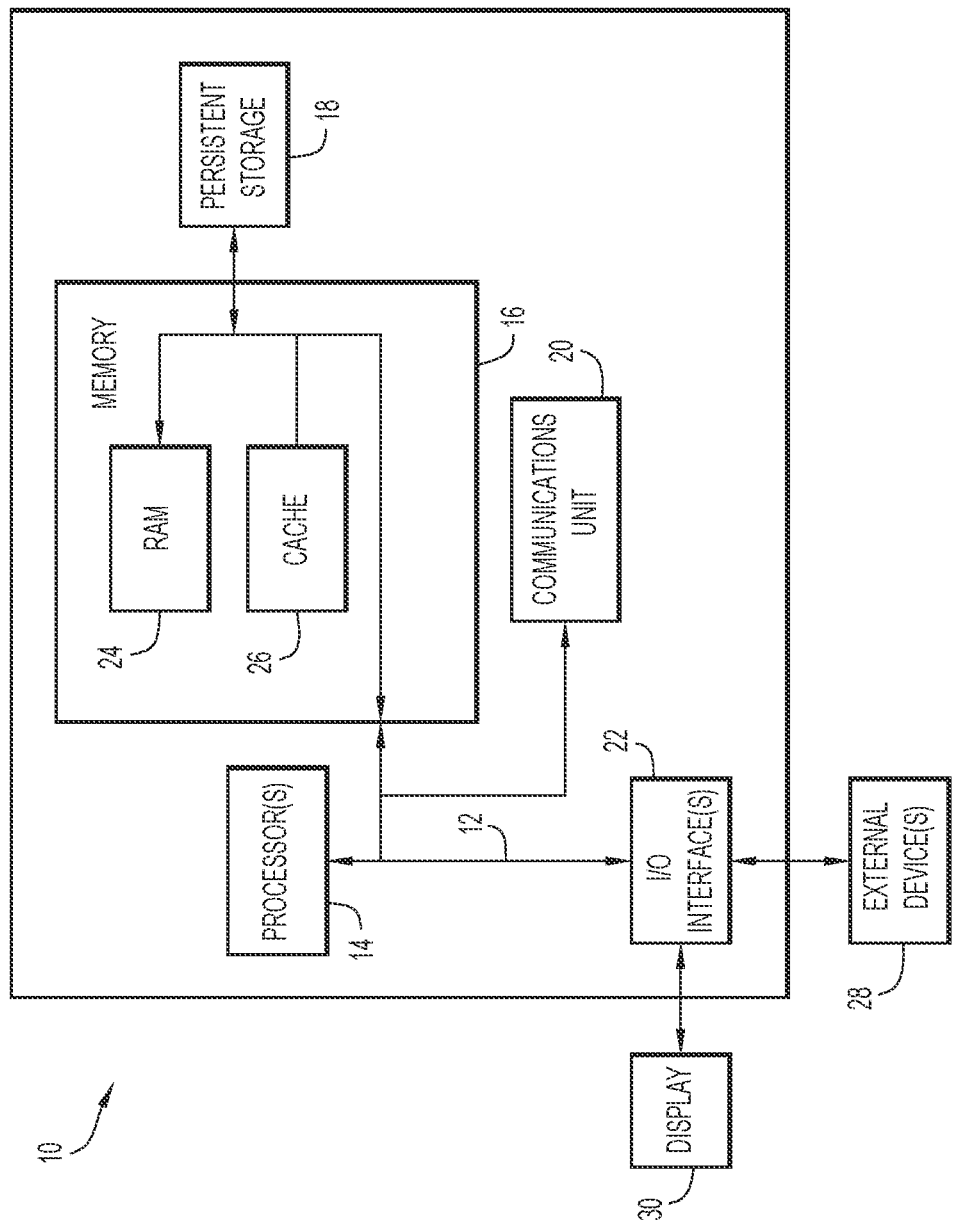
FIG. 7 is a block diagram depicting a computing device in accordance with an embodiment of the present invention.

FIG. 7 is a block diagram depicting components of a computer 10 suitable for executing the methods disclosed herein. Computer 10 may implement client device 105 and/or document management server 135 in accordance with embodiments of the present invention. It should be appreciated that FIG. 7 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to automated document generation (e.g., input data, structured data feeds, template document data, finished document data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105 and/or document management server 135 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to automated document generation (e.g., input data, structured data feeds, template document data, finished document data, etc.) may include any information provided to, or generated by, client device 105 and/or document management server 135. Data relating to automated document generation may include any desired format and arrangement, and may include any quantity of any types of fields of any size to store any desired data. The data relating to automated document generation may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to automated document generation), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving the automated generation of documents.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, word processing module 115, pre-processor 120, template processor 125, feed generator module 145, document manager 150, etc.). These systems may include any types of monitors and input devices (e.g., keyboard, mouse, voice recognition, etc.) to enter and/or view information.

It is to be understood that the software (e.g., communications software, server software, word processing module 115, pre-processor 120, template processor 125, feed generator module 145, document manager 150, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, word processing module 115, pre-processor 120, template processor 125, feed generator module 145, document manager 150, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to automated document generation). The database system may be implemented by any number of any conventional or other databases, data stores or storage structures (e.g., files, databases, data structures, data or other repositories, etc.) to store information (e.g., data relating to automated document generation). The database system may be included within or coupled to the server and/or client systems. The database systems and/or storage structures may be remote from or local to the computer or other processing systems, and may store any desired data (e.g., data relating to automated document generation).

The present invention embodiments may employ any number of any type of user interface (e.g., Graphical User Interface (GUI), command-line, prompt, etc.) for obtaining or providing information (e.g., data relating to automated document generation), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, template-based automated generation of customized documents.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for conditionally processing a template document to produce one or more finished documents, the method comprising:
- identifying one or more annotations in the template document, wherein each annotation indicates an instruction name and a portion of the template document to which the annotation is applied;
- processing the template document using one or more structured data feeds, wherein the one or more structured data feeds indicate, for each annotation, instructions for transforming the portion of the template document associated with the annotation, wherein the instructions are indicated based on the instruction name of the annotation; and
- generating the one or more finished documents corresponding to the one or more structured data feeds by executing the instructions of each structured data feed to transform the template document into each finished document, wherein the transforming includes one or more of: replacing data in the template document, adding data to the template document, and removing data from the template document.

2. The computer-implemented method of claim 1, wherein an instruction name of an annotation includes a variable, and wherein the variable is evaluated using the one or more structured data feeds to determine the instructions to apply to the template document for each structured data feed.

3. The computer-implemented method of claim 1, wherein the one or more annotations are supported natively by a file type of the template document.

4. The computer-implemented method of claim 1, wherein the one or more annotations include one or more of: a comment applied to a portion of the template document, wherein a content of the comment comprises the instruction name, and a style applied to a portion of the template document, wherein a style name of the style comprises the instruction name.

5. The computer-implemented method of claim 1, wherein the template document is processed using the one or more structured data feeds by an extension of a word processing module.

6. The computer-implemented method of claim 1, wherein the one or more structured data feeds are separate documents from the template document.

7. The computer-implemented method of claim 1, wherein the template document is presented to a user via a user interface, and wherein the one or more annotations are hidden from the user interface.

8. A computer system for conditionally processing a template document to produce one or more finished documents, the computer system comprising:
- one or more computer processors;
- one or more computer readable storage media;
- program instructions stored on the one or more computer readable storage media for execution by at least one of the one or more computer processors, the program instructions comprising instructions to:
- identify one or more annotations in with the template document, wherein each annotation indicates an instruction name and a portion of the template document to which the annotation is applied;
- process the template document using one or more structured data feeds, wherein the one or more structured data feeds indicate, for each annotation, instructions for transforming the portion of the template document associated with the annotation, wherein the instructions are indicated based on the instruction name of the annotation; and
- generate the one or more finished documents corresponding to the one or more structured data feeds by executing the instructions of each structured data feed to transform the template document into each finished document, wherein the transforming includes one or more of: replacing data in the template document, adding data to the template document, and removing data from the template document.

9. The computer system of claim 8, wherein an instruction name of an annotation includes a variable, and wherein the variable is evaluated using the one or more structured data feeds to determine the instructions to apply to the template document for each structured data feed.

10. The computer system of claim 8, wherein the one or more annotations are supported natively by a file type of the template document.

11. The computer system of claim 8, wherein the one or more annotations include one or more of: a comment applied to a portion of the template document, wherein a content of the comment comprises the instruction name, and a style applied to a portion of the template document, wherein a style name of the style comprises the instruction name.

12. The computer system of claim 8, wherein the template document is processed using the one or more structured data feeds by an extension of a word processing module.

13. The computer system of claim 8, wherein the one or more structured data feeds are separate documents from the template document.

14. The computer system of claim 8, wherein the template document is presented to a user via a user interface, and wherein the one or more annotations are hidden from the user interface.

15. A computer program product for conditionally processing a template document to produce one or more finished documents, the computer program product comprising one or more computer readable storage media collectively having program instructions embodied therewith, the program instructions executable by a computer to cause the computer to:
- identify one or more annotations in the template document, wherein each annotation indicates an instruction name and a portion of the template document to which the annotation is applied;
- process the template document using one or more structured data feeds, wherein the one or more structured data feeds indicate, for each annotation, instructions for transforming the portion of the template document associated with the annotation, wherein the instructions are indicated based on the instruction name of the annotation; and
- generate one or more finished documents corresponding to the one or more structured data feeds by executing the instructions of each structured data feed to transform the template document into each finished document, wherein the transforming includes one or more of: replacing data in the template document, adding data to the template document, and removing data from the template document.

16. The computer program product of claim 15, wherein an instruction name of an annotation includes a variable, and wherein the variable is evaluated using the one or more structured data feeds to determine the instructions to apply to the template document for each structured data feed.

17. The computer program product of claim 15, wherein the one or more annotations are supported natively by a file type of the template document.

18. The computer program product of claim 15, wherein the one or more annotations include one or more of: a comment applied to a portion of the template document, wherein a content of the comment comprises the instruction name, and a style applied to a portion of the template document, wherein a style name of the style comprises the instruction name.

19. The computer program product of claim 15, wherein the template document is processed using the one or more structured data feeds by an extension of a word processing module.

20. The computer program product of claim 15, wherein the one or more structured data feeds are separate documents from the template document.

\* \* \* \* \*